United States Patent Office 3,366,660
Patented Jan. 30, 1968

3,366,660
DIBENZO CYCLOHEPTENE THIOIMINOESTERS
Martin A. Davis, Montreal, Quebec, and David J. Campbell, Pincourt, Quebec, Canada, assignors to American Home Products Corporation, New York, N.Y., a corporation of Delaware
No Drawing. Filed May 23, 1966, Ser. No. 551,949
2 Claims. (Cl. 260—453)

This invention relates to novel chemical compounds; the compounds have useful biological activities.

More particularly, this invention relates to new thioiminoesters and their acid addition salts with inorganic acids. The compounds may be represented by the following general Formula I.

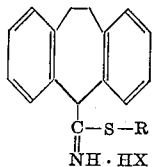

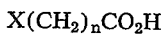

in which R represents lower alkyl, aralkyl, or carboxyalkyl group of the type —$(CH_2)_nCO_2H$ in which $n$ is an integer greater than one, and X represents a halogen selected from the group consisting of chlorine, bromine and iodine.

The novel thioiminoesters as their hydrohalide acid addition salts are obtained directly by treating a thiocarboxamide, namely 10,11 - dihydro-5H-dibenzo[a,d]cycloheptene-5-thiocarboxamide (III), with alkyl, aralkyl, or carboxyalkyl halides of the formula RX or $$X(CH_2)_nCO_2H$$

where R, X and $n$ are as defined above. The reaction may be carried out in an inert solvent, such as, for example, chloroform or acetonitrile, and at an elevated temperature of from 50 to 80° C. The desired product may be isolated by cooling the solution to precipitate the hydrohalide salt or by removal of the solvent in vacuo.

The intermediate, 10,11-dihydro-5H-dibenzo[a,d]cycloheptene-5-thiocarboxamide (III) may be prepared from 10,11-dihydro - 5H - dibenzo[a,d]cycloheptene-5-carbonitrile (II) following a general procedure described by E. G. Kornfeld, in J. Org. Chem. 16, 131 (1951) for the preparation of 2,2-diphenylthioacetamide. Accordingly, a mixture of the carbonitrile of Formula II and ethanol is saturated with gaseous ammonia and hydrogen sulfide. The mixture is then heated in a closed vessel at an elevated temperature to give the desired thiocarboxamide which is isolated by precipitation with water and purified by crystallization. Alternatively, the thiocarboxamide (III) may be obtained from the carbonitrile (II) by treatment with thioacetamide in dimethylformamide which has been saturated with gaseous hydrogen chloride. This general method, described by E. C. Taylor et al. in J. Amer. Chem. Soc., 82, 2656 (1960) is convenient in that it obviates the need for high-pressure equipment. The reactions may be summarized in the following flow sheet:

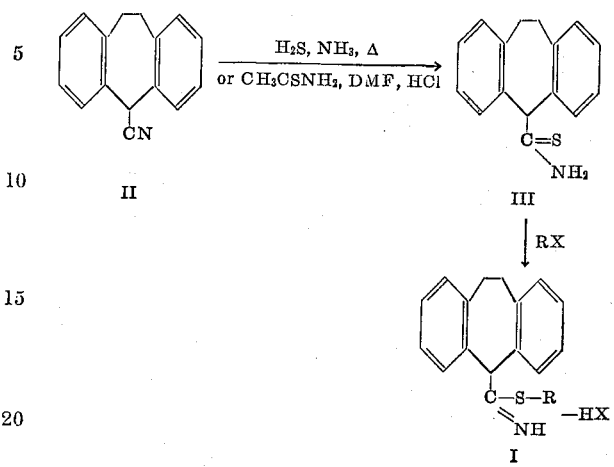

The novel compounds of this invention have important biological properties and are valuable as medicaments. More particularly, the thioiminoesters of Formula I wherein R equals —$CH_2CH_3$ or $(CH_2)_2CO_2H$ and X represents the bromide and iodide ions, respectively, possess antiparasitic activities, having larvicidal actions on horse strongyles. The compound 2-carboxyethyl 10,11-dihydro-5H-dibenzo[a,d]cycloheptene-5-thiocarboximidate hydroiodide (I, R=$(CH_2)CO_2H$, X=I) has a particularly high activity in this respect. The compounds may be used to decontaminate premises or pastures which have been infected with horse strongyles or other members of the strongylidae family, for example, hookworms, trichostrongylidae or metastrongylidae. For this purpose the compounds may be formulated either as suspensions or solutions in an aqueous vehicle, optionally containing an organic co-solvent, such as, for example, a lower alkanol. The amount of active ingredient present may be within the range of from 0.01 to 0.0005 mole per litre. The compound of Formula I in which R represents $CH_2CH_3$ also has anthelmintic activity against the pinworm Syphacia obvelata and is useful in the treatment of pinworm infestations in mammals. It may be administered orally in the form of capsules, tablets or suspensions in an aqueous vehicle so as to provide a unit dosage of from 100 to 400 mg.

The compounds of this invention further possess actions of the central nervous system of mammals. Most importantly they have anticonvulsant effects and are anticonvulsant agents. The compounds of Formula I where R represents —$CH_2CH_3$ affords a significant degree of protection against the effects produced by the administration of a convulsant dose of pentylenetetrazole. The effect is elicited in doses considerably lower than those causing neurotoxicity. Thus, in the treatment of convulsive disorders of the grand mal and petit mal type, the compound may be given orally in tablets or capsules containing from 25 to 300 mg. of the active ingredient and may be administered once to four times daily.

In addition to the above-mentioned properties the compounds of this invention also have antibacterial and trichomonicidal activities and anti-ulcer activity.

The following descriptive examples will serve to illustrate our invention but are not to be construed as limiting it thereto.

EXAMPLE 1

*10,11-dihydro-5H-dibenzo[a,d]cycloheptene-5-thiocarboxamide (III)*

(a) A mixture of 10,11-dihydro-5H-dibenzo[a,d]cycloheptene-5-carbonitrile (II), (13.1 g., 0.06 mole) and absolute ethanol (100 ml.) is saturated with ammonia and hydrogen sulfide. The mixture is heated in an autoclave at 155° for 8 hours, cooled, and poured into water (300 ml.). The precipitate is filtered off, dried and recrystallized from acetonitrile yielding the title compound as yellow prisms, M.P. 193–194° C. Elemental analysis confirms the empirical formula $C_{16}H_{15}NS$.

(b) Dry dimethylformamide (250 ml.) is saturated with gaseous hydrogen chloride. Thioacetamide (37.6 g., 0.5 mole) and the carbonitrile (II), (54.8 g., 0.25 mole) are added and the yellow solution is heated on an oil bath at 120–130° for 2 hours; a slow stream of nitrogen is passed through during this time. Part of the solvent is then removed in vacuo, water (300 ml.) is added and the mixture is neutralized by the addition of sodium bicarbonate. The precipitate is filtered off and dried to yield the title compound as above, M.P. 191–195° C.

EXAMPLE 2

*Ethyl 10,11-dihydro-5H-dibenzo[a,d]cycloheptene-5-thiocarboximidate hydrobromide (I, R=$C_2H_5$, X=Br)*

A solution of the thiocarboxamide (III) obtained as described in Example 1 (7.6 g., 0.03 mole) and ethyl bromide (10.9 g., 0.1 mole) in chloroform (125 ml.) is heated under reflux for 36 hours. The solvent is removed by evaporation and the residue is triturated with hot ethyl acetate, yielding the title compound as the insoluble material with M.P. 176–178° C. Elemental analysis confirms the empirical formula $C_{18}H_{20}BrNS$.

EXAMPLE 3

*2 - carboxyethyl 10,11 - dihydro - 5H - dibenzo[a,d] cycloheptene - 5 - thiocarboximidate hydroiodide (I, R=$(CH_2)_2CO_2H$, X=I)*

A solution of the thiocarboxamide (III) obtained as described in Example 1 (16.6 g., 0.07 mole) and 3-iodopropionic acid (13.3 g., 0.07 mole) in chloroform (300 ml.) is heated under reflux for 48 hours. Part of the solvent is removed in vacuo and the mixture is chilled. The precipitate is filtered off to give the title compound with M.P. 199–201° C. after recrystallization from either chloroform or acetonitrile-nitromethane. Elemental analysis confirms the empirical formula $C_{19}H_{20}INO_2S$.

We claim:
1. Ethyl 10,11 - dihydro-5H-dibenzo[a,d]cycloheptene-5-thiocarboximidate hydrobromide.
2. 2-carboxyethyl 10,11 - dihydro-5H-dibenzo[a,d]cycloheptene-5-thiocarboximidate hydroiodide.

References Cited

UNITED STATES PATENTS

| | | | |
|---|---|---|---|
| 2,091,257 | 8/1937 | Eckelmann | 260—453 X |
| 3,317,582 | 5/1967 | Tishler | 260—453 X |

CHARLES B. PARKER, *Primary Examiner.*

S. T. LAWRENCE, *Assistant Examiner.*